(12) United States Patent
Vlachos et al.

(10) Patent No.: US 7,145,564 B1
(45) Date of Patent: Dec. 5, 2006

(54) METHOD AND APPARATUS FOR TESSELLATION LIGHTING

(75) Inventors: Alexander C. Vlachos, Brighton, MA (US); Vineet Goel, Orlando, FL (US)

(73) Assignee: ATI International, SRL (BB)

( * ) Notice: Subject to any disclaimer, the term of this patent is extended or adjusted under 35 U.S.C. 154(b) by 1070 days.

(21) Appl. No.: 09/585,217

(22) Filed: Jun. 1, 2000

(51) Int. Cl.
*G06T 15/00* (2006.01)

(52) U.S. Cl. ..................................... 345/423

(58) Field of Classification Search ............... 345/419, 345/422, 423, 559, 586, 625, 643, 627, 644, 345/421

See application file for complete search history.

(56) References Cited

U.S. PATENT DOCUMENTS

| | | | | |
|---|---|---|---|---|
| 5,357,599 A | * | 10/1994 | Luken | 345/627 |
| 5,488,684 A | * | 1/1996 | Gharachorloo et al. | 345/423 |
| 5,854,631 A | * | 12/1998 | Akeley et al. | 345/419 |
| 6,163,319 A | * | 12/2000 | Peercy et al. | 345/426 |
| 6,674,433 B1 | * | 1/2004 | Junkins | 345/423 |
| 6,734,860 B1 | * | 5/2004 | Potter et al. | 345/501 |

OTHER PUBLICATIONS

Owen, "Phong Shading Model for Scan-Line Graphics," Mar. 13, 1999, Association for Computing Machinery (ACM).*
Computer Graphics Principles and Practice, 1996.

* cited by examiner

*Primary Examiner*—Almis R. Jankus
*Assistant Examiner*—Lance W. Sealey
(74) *Attorney, Agent, or Firm*—Vedder, Price, Kaufman & Kammholz, P.C.

(57) ABSTRACT

A method and apparatus for performing tessellation lighting operations for video graphics primitives in a video graphics system is presented. When the vertex parameters corresponding to the vertices of a video graphics primitive are received, a tessellation operation is performed such that a number of component primitives are generated. The vertex parameters corresponding to the vertices of the component primitives are then calculated utilizing the vertex parameters for the original video graphics primitive. Such calculation operations include determining a corresponding normal vector for each component primitive vertex. Each of the component primitives is then individually processed. Such processing may include calculating the lighting effects for each component primitive and performing additional processing operations that generate pixel fragments for the primitive. The resulting pixel fragments are blended with image data stored in a frame buffer, where the image data is used in generating a displayed image.

25 Claims, 5 Drawing Sheets

METHOD AND APPARATUS FOR TESSELLATION LIGHTING

FIELD OF THE INVENTION

The invention relates generally to video graphics processing and more particularly to a method and apparatus for tessellation lighting of video graphics primitives.

BACKGROUND OF THE INVENTION

Video graphics display systems commonly utilize primitives, often in the form of triangle primitives, to model objects to be drawn to a displayed image. Modeling the object to be drawn using primitives often requires a number of primitives in order to accurately represent three-dimensional objects. Each of these primitives includes a number of parameters corresponding to each of the vertices of the primitive. The parameters include color and alpha blending values, as well as spatial coordinates and normal vectors that may be used for calculating lighting effects that aid in accurately representing the object in the displayed image.

In prior art systems, the color and alpha blending values at each vertex of the video graphics primitive are calculated and then interpolated across the primitive in order to determine the specific color and alpha values for each pixel included in the primitive. Determination of the color values at the vertices of the primitive could include calculating lighting effects based on one or more lighting sources that may affect the color at the vertices. An equation commonly used for determination of vertex color values such that lighting effects are included is:

$$\text{Vertex\_color} = \text{emissive\_color} + (\text{ambient\_light} \times$$
$$\text{ambient material\_color}) + \sum_{i=0}^{M} (\text{range}) \times (\text{spot\_atten.}) \times$$
$$[(\text{ambient\_light} \times \text{ambient\_material\_color}) +$$
$$(\vec{n} \cdot \vec{L})(\text{diffuse\_light} \times \text{diffuse\_material\_color}) +$$
$$(\vec{s} \cdot \vec{n})(\text{specular\_light} \times \text{specular\_material\_color})]$$

wherein the summation portion has a component corresponding to each light source that is relevant.

As the equation illustrates, the vertex color values are a function of a number of different factors. Such factors are well known in the art, and the calculations required to determine the vertex colors are also well known. As the equation indicates, some of the factors are dependant on the normal vector ($\vec{n}$) that corresponds to the particular vertex. Such normal vectors represent a vector that is normal to the surface of the object at the point where the vertex is located.

Problems can arise when large video graphics primitives are drawn that include lighting effects that are dependent on the normal values at the vertices. This is because prior art video graphics systems commonly interpolate the vertex color and alpha values across the entire primitive in order to determine the specific color and alpha values for each pixel within the primitive. Because the lighting effects are only calculated at the vertices, the shading produced by such lighting effects will be linearly spread across such large primitives, often reducing the realism with which the object is rendered. Such prior art interpolation of vertex color and alpha values to determine specific pixel color and alpha values is commonly referred to as Gouraud shading.

In order to avoid some of the detrimental effects on the shading of the primitive due to interpolation, another prior art technique for calculating lighting effects commonly known as Phong shading is used. Phong shading recalculates a normal value for each pixel location prior to determining the specific color and alpha values for that specific location. Although Phong shading produces better results than Gouraud shading, the processing bandwidth required to implement full-scale Phong shading is relatively large, and therefore Phong shading is impractical in most video graphics systems as it is too expensive to implement.

Therefore, a need exists for a method and apparatus for performing lighting operations with respect to primitives that improves on the coarse granularity of Gouraud shading while reducing the processing bandwidth requirements in comparison with those corresponding to Phong shading.

DETAILED DESCRIPTION

Generally, the present invention provides a method and apparatus for performing tessellation lighting operations for video graphics primitives in a video graphics system. When the vertex parameters corresponding to the vertices of a video graphics primitive are received, a tessellation operation is performed such that a number of component primitives are generated. The vertex parameters corresponding to the vertices of the component primitives are then calculated utilizing the vertex parameters for the original video graphics primitive. Such calculation operations include determining a corresponding normal vector for each component primitive vertex. Each of the component primitives is then individually processed. Such processing may include calculating the lighting effects for each component primitive and performing additional processing operations that generate pixel fragments for the primitive. The resulting pixel fragments are blended with image data stored in a frame buffer, where the image data is used in generating a displayed image.

By tessellating video graphics primitives prior to performing lighting and subsequent processing operations, better lighting effects are achieved than those associated with Gouraud shading. At the same time, the processing bandwidth required to perform such improved lighting does not require the large amounts of processing bandwidth associated with Phong shading. Furthermore, the level with which individual video graphics primitives are tessellated can be controlled such that only larger or more complex video graphics primitives are tessellated for lighting operations. As such, overall display quality is improved while limiting the additional processing bandwidth required.

Figure 1:
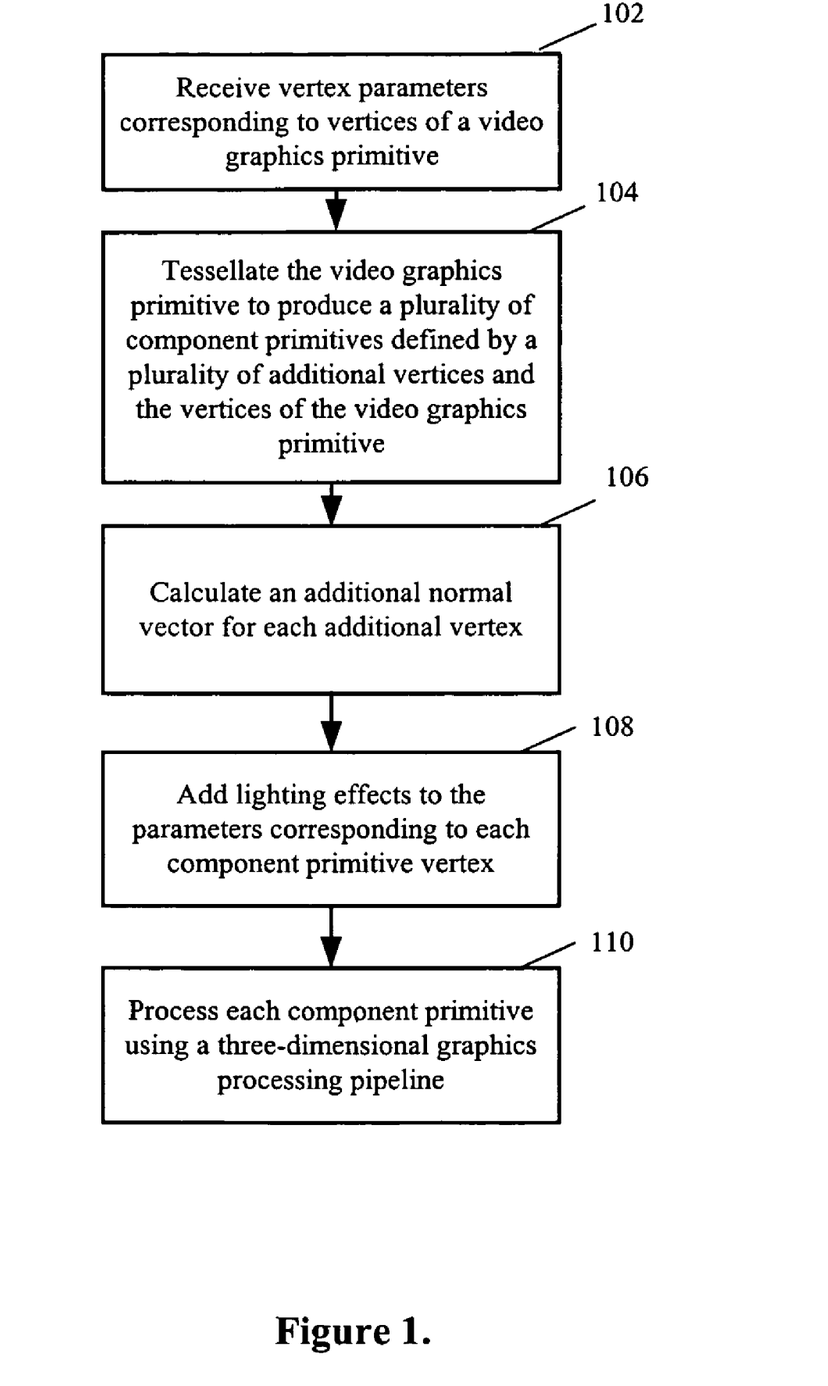
FIG. 1 illustrates a flow diagram of a method for video graphics processing in accordance with a particular embodiment of the present invention.

The invention can be better understood with reference to FIGS. 1–5. FIG. 1 illustrates a flow diagram of a method for video graphics processing that includes performing tessellation operations for processing applications such as lighting operations. The method begins at step 102 where vertex parameters corresponding to vertices of a video graphics primitive are received. The vertex parameters for each vertex may include three-dimensional (3D) coordinates corresponding to the vertex and a normal vector that represents a normal to the surface of the object for which the video graphics primitive is a part. The vertex parameters may also include a base color value that can be modified by lighting calculations that may be based on the location and direction of light sources and the particular normal vectors corresponding to each of the vertices as described earlier.

Figure 2:
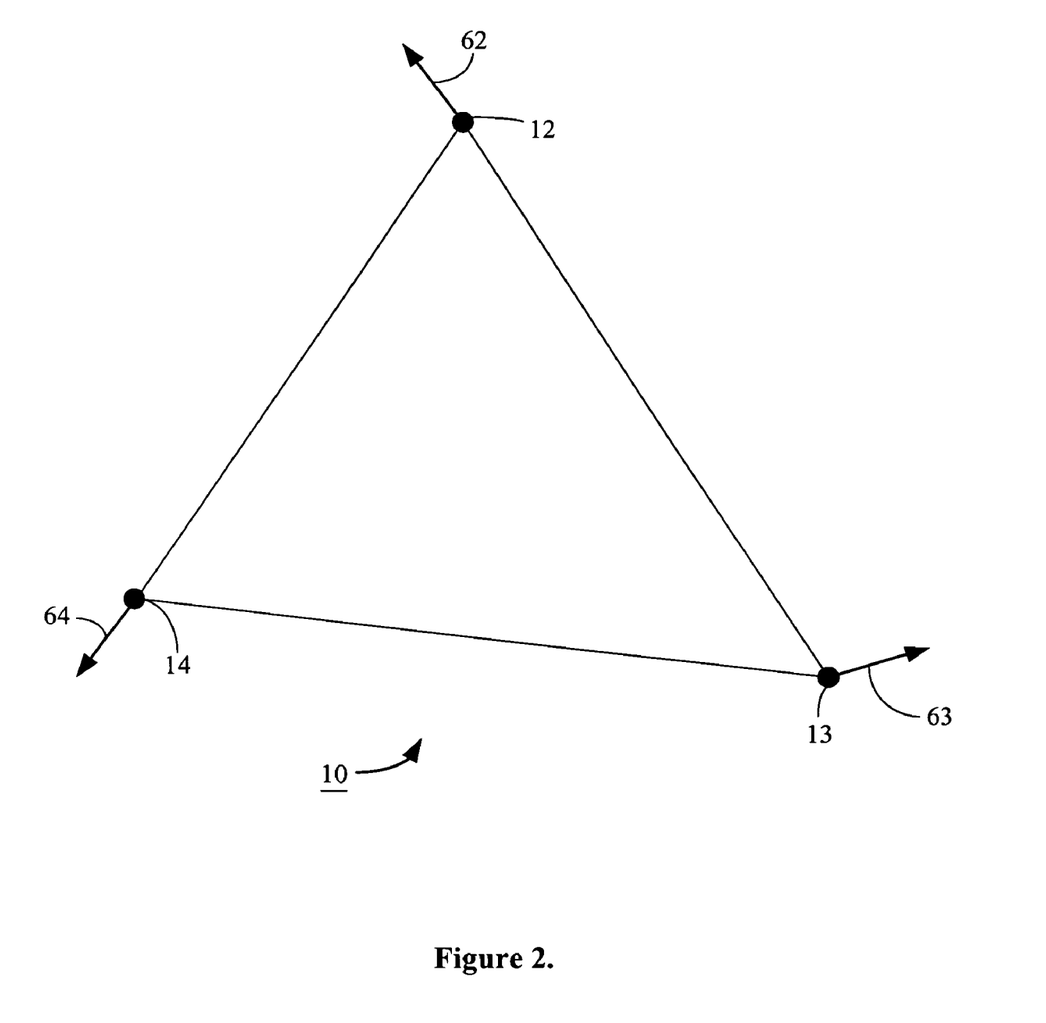
FIG. 2 illustrates a graphical representation of a video graphics primitive with corresponding normal vectors.

FIG. 2 illustrates a video graphics primitive 10, which is a triangular video graphics primitive. The video graphics primitive 10 is defined by vertices 12–14. Each vertex is shown to have a corresponding normal vector 62–64, respectively. In prior art Gouraud shading techniques, the normal vectors 62–64 would be used to calculate the lighting effects for the primitive 10 at each of the vertices 12–14. These lighting effects would then be linearly interpolated across the entire primitive 10 to produce the resulting color values for each of the pixels. However, as described above, this can produce very linear shading, which is often undesirable in the display of video graphics images.

Figure 3:
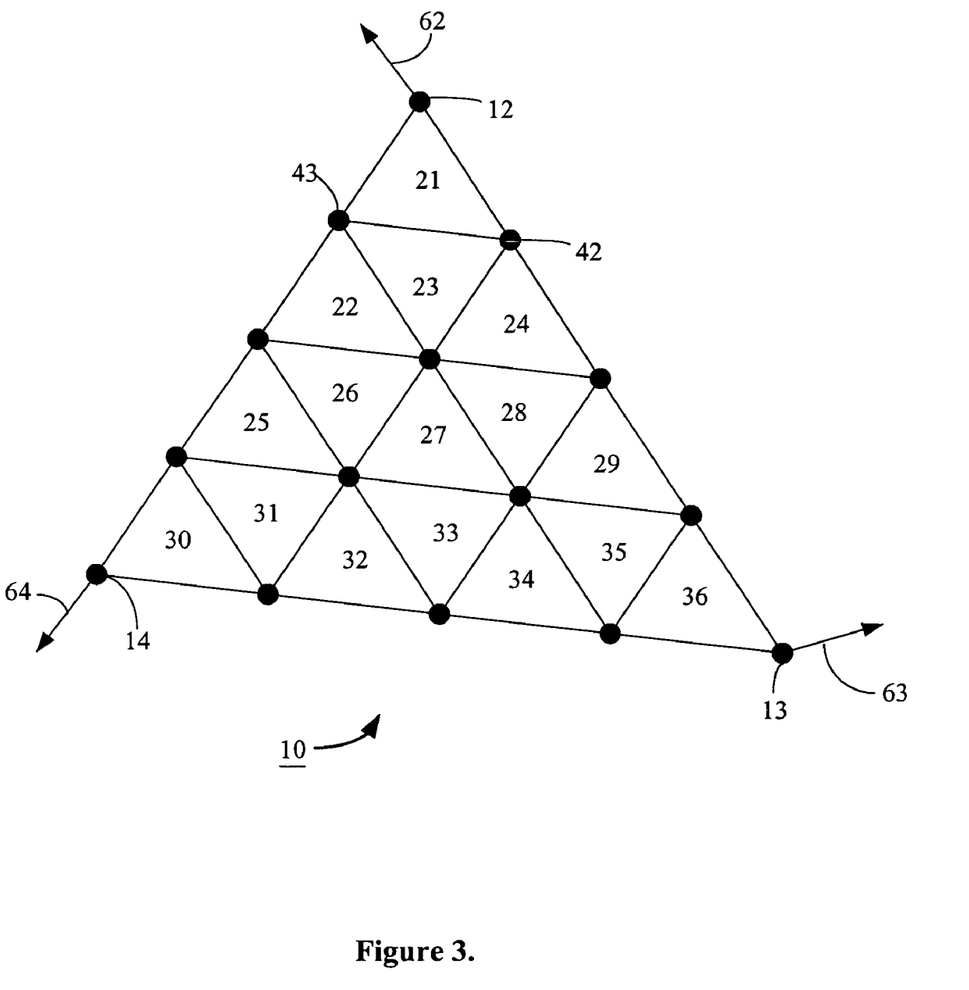
FIG. 3 is a graphical representation of the video graphics primitive of FIG. 2 following tessellation.

At step 104, the video graphics primitive is tessellated to produce a plurality of component primitives. The plurality of component primitives is defined by a plurality of additional vertices and the vertices of the original video graphics primitive. FIG. 3 illustrates the primitive 10 following tessellation, where in the example illustrated, the level of tessellation has resulted in 15 component primitives 21–36. Each of the component primitives 21–36 is defined by component vertices, where each component vertex has a corresponding set of component vertex parameters. For example, the component primitive 21 is defined by the component vertices 42 and 43 as well as the original primitive vertex 12. The component vertex parameters corresponding to each component vertex preferably include a set of 3D coordinates and a component vertex normal vector. Additional parameters, such as a base color value may also be included in each set of component vertex parameters. The component vertex parameters are derived from the original primitive vertex parameters corresponding to the primitive vertices 12–14.

Returning to FIG. 1, step 106 includes the calculation of the additional normal vectors corresponding to each of the additional vertices that are created through tessellation. The additional normal vectors may be calculated at each component vertex utilizing interpolation techniques, where in one embodiment, linear interpolation is used to calculate the additional normal vectors. In other embodiments, more complex calculations can be performed such as Nth order interpolation, where N is a number greater than one. For example, in one embodiment, a quadratic interpolation operation may be utilized to calculate the additional normal vectors. More complex interpolation may be utilized to achieve better approximations of the normal for the object to which the original primitive corresponds at the locations corresponding to each of the component vertices that have been created through tessellation. Following calculation of the additional normal vectors, these normal vectors may be re-normalized prior to use in lighting calculations.

Figure 4:
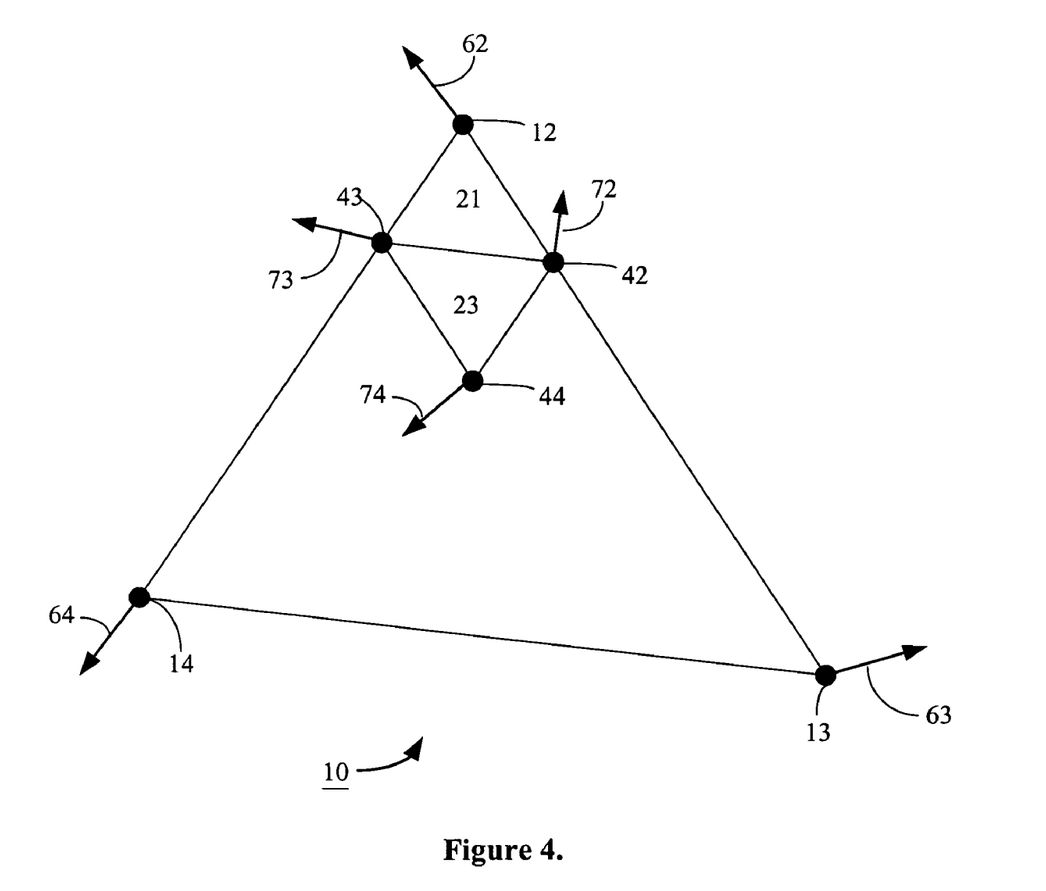
FIG. 4 provides a graphical representation of the video graphics primitive of FIG. 3 where normal vectors are calculated for some of the component primitives resulting from tessellation in accordance with a particular embodiment of the present invention.

Referring to FIG. 4, the component vertex normal vectors 72–74 are shown. The component vertex normal vector 72 corresponding to the component vertex 42 may be calculated by at least interpolating between the primitive vertex normal vector 62 and the primitive vertex normal vector 63. Similarly, the component vertex normal vector 73 may be determined through interpolation between the primitive vertex normal vector 62 and the primitive vertex normal vector 64. The component vertex normal vector 74 can be calculated as a function of each of the primitive vertex normal vectors 62–64.

The component vertex normal vectors 72–74 all correspond to the component primitive 23. The component vertex normal vector 72 and 73 are also component vertex normal vectors corresponding to the component primitive 21, which is also defined by the primitive vertex normal vector 62 corresponding to the original primitive. As such, performing the calculation steps required to determine the component vertex normal vectors 72 and 73 need only be performed once, and the resulting normal vectors 72 and 73 can be used for subsequent processing operations corresponding to each of the component primitives 21 and 23. As can be seen by referring to FIG. 3, the component vertex parameters corresponding to many of the component vertices resulting from tessellation of the primitive 10 can be reused for multiple component primitives.

Once the component vertex parameters are determined for each of the component primitives, where the component vertex parameters can include component vertex normal vectors, 3D coordinates, and base color values for the component primitives, each of the component primitives can be processed as if it were a typical video graphics primitive generated through other means within the system. However, by breaking up the original primitive into a plurality of component primitives, the coarseness with which lighting effects or other processing operations are performed can be reduced such that a better resulting image is produced.

Referring back to FIG. 1, step 108 includes the addition of lighting effects to the component primitive parameters for each of the component primitives. This may include calculating vertex lighting effects at each of the component vertices for the component primitives. Once the lighting effects for each component primitive vertex have been calculated, subsequent processing utilizing a 3D graphics pipeline at step 110 will cause the resulting pixel data produced to include lighting effects at each pixel location that have been calculated based on the vertex data that includes the lighting effects added at step 108.

The lighting effects added at step 108 may include the addition of specular lighting effects, diffuse lighting effects, or environment mapping lighting effects. Each of these different types of lighting effects corresponds to a different portion of the equation listed in the background section above. Diffuse lighting effects are those lighting effects that are not dependent upon the positioning of the viewer of the object being rendered. Examples include shadows or general illumination of the object. Specular lighting is based on the relative positioning of the viewer with respect to the object for which the lighting effects are being determined. An example would include the viewing of a shinny spot on a spherical structure corresponding to a particular point light source, where such a spot would track along the surface of the ball if the position of the viewer were to move. Environment mapping lighting effects are those lighting effects that reflect the environment within which the object being drawn exists. Such lighting effects include spherical, dual parabolic, and cubic environment mapping effects.

The processing performed at step 110 using the 3D video graphics pipeline can include functions commonly performed by blocks such as a setup engine, a raster engine, a pixel pipe, and a render backend block. In such a system, the setup engine produces primitive slope information based on the component primitives. The slope information is then provided to a raster engine that generates pixel fragments from the primitive slope information. Such rasterization performs the calculations that generate the pixel data such that it includes the lighting effects generated at step 108. For example, if the lighting effects alter the original color values associated with a particular component primitive, rasterization of that component primitive will be based on these modified color values such that the lighting effects generated for the individual vertices of the component primitive are used in determination of the color values for each of the pixel location. This is similar to the Gouraud shading operations described earlier.

After rasterization, the pixel fragments are provided to a pixel pipe that performs various operations that may modify the color of the pixel fragments as received from the raster engine. Such operations can include texture mapping operations, where texture coordinate data may also be included in the vertex parameters corresponding to the original video graphics primitive. Following the processing within the pixel pipe, the fragments are passed to a render backend block, which blends the fragment data with pixel data already stored for a display frame in a frame buffer such that the contributions of the component primitive to the overall displayed image are included. Such blending operations performed by the render backend block are well known in the art.

Figure 5:
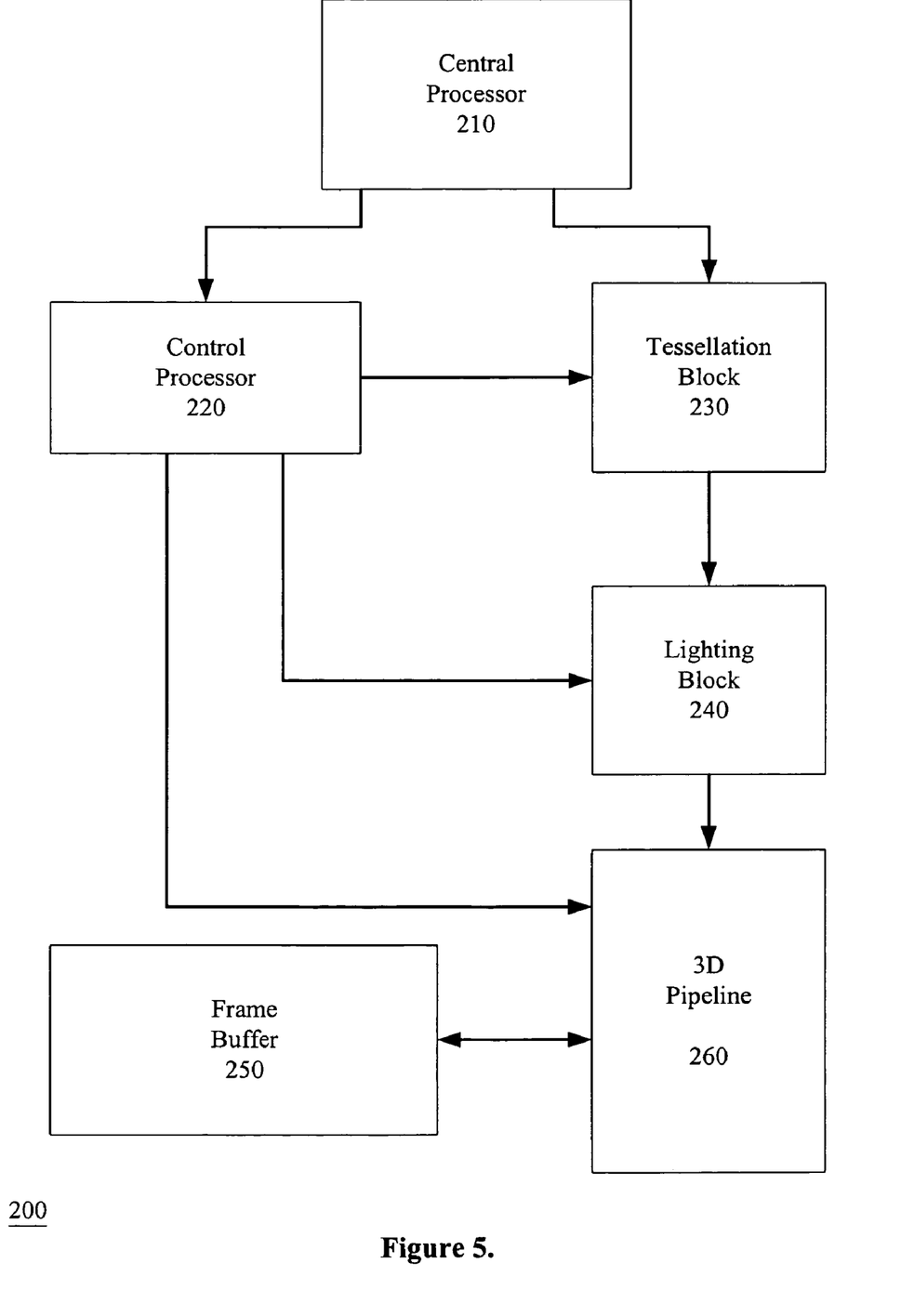
FIG. 5 illustrates a block diagram of a video graphics processing circuit in accordance with a particular embodiment of the present invention.

FIG. 5 illustrates a block diagram of a video graphics circuit 200 that includes a central processor 210, a control processor 220, a tessellation block 230, a lighting block 240, a 3D pipeline 260, and a frame buffer 250. The central processor 210 generates processing commands and vertex parameters corresponding to video graphics primitives that are to be rendered to a display frame.

The control processor 220, which is operably coupled to the central processor 210, receives the processing commands from the central processor and generates control information based on the processing commands. Such control information may include specific portions directed to each of the tessellation block 230, the lighting block 240, and the 3D pipeline 260. Such control information may relate to the specific manner with which a particular video graphics primitive generated by the central processor 210 is to be processed by these corresponding circuit components.

The tessellation block 230, which is operably coupled to the central processor 210 and the control processor 220, receives a first portion of the control information from the control processor 220. The tessellation block 230 receives vertex parameters corresponding to each of the vertices for each video graphics primitive produced by the central processor 210. Depending on the control information received from the control processor 220, the tessellation block 230 may or may not tessellate each video graphics primitive that it receives. Furthermore, when the tessellation block does tessellate a video graphics primitive to produce a plurality of component primitives, the number of component primitives produced may be based on a tessellation level that is included in the control information that it receives. The control information that it receives corresponding to tessellation operations may be referred to as tessellation information.

When the tessellation block 230 tessellates a video graphics primitive to produce a plurality of component primitives, component vertex parameters are generated by the tessellation block 230 for each of the vertices corresponding to the plurality of component primitives. Such component vertex parameters can include color values, 3D coordinates, and vertex normal vectors. Such calculations may be performed using linear interpolation or Nth order interpolation as described above. As stated earlier, quadratic interpolation may be useful for calculating normal vectors as it provides a more accurate result than linear interpolation.

The lighting block 240, which is operably coupled to the control processor 220 and the tessellation block 230, receives component vertex parameters corresponding to each of the component primitives generated by the tessellation block 230. The lighting block 240 also receives a second portion of the control information from the control processor 220, where such control information may indicate whether or not any lighting effects, and also what type of lighting effects, should be added to individual component primitives. Based on the control information received, the lighting block 240 adds lighting effects to the component vertex parameters for each of the component primitives to produce modified vertex parameters. Such lighting effects may include diffuse lighting effects, specular lighting effects, and environmental mapping lighting effects as described above.

The 3D pipeline 260, which is operably coupled to the control processor 220, the lighting block 240, and the frame buffer 250, receives the modified vertex parameters for each of the component primitives. The 3D pipeline 260 processes each of the component primitives to generate pixel fragment data that are blended with pixel data currently stored for the frame in the frame buffer 250. The 3D pipeline 260 individually processes each of the component primitives such that the specific lighting effects generated for each component primitive by the lighting block 240 directly influence the resulting colors for the individual pixel locations within the overall video graphics primitive which has been tessellated. As such, more accurate lighting effects that improve on the coarser effects that would normally be generated without tessellation are achieved.

As is apparent to one of ordinary skill in the art, when 3D processing operations performed within the 3D pipeline utilize the normal vectors corresponding to each of the vertices of the individual component primitives, more accurate results may also be achieved such that the tessellation may be beneficial for applications aside from lighting. It should also be noted that various memory and buffer structures may be included in the video graphics circuit 200 to facilitate the efficiency with which the video graphics circuit 200 operates. For example, memory or buffering may be included between the central processor 210 and the control processor 220 as well as between the central processor 210 and the tessellation block 230 to allow the central processor 210 to issue processing commands and vertex parameters corresponding to a number of video graphics primitives in a short period of time in order to allow the central processor 210 to perform other processing functions. The memory or buffers may be accessed by the control processor 220 and the tessellation block 230 to retrieve the data associated with individual video graphics primitives for processing.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for video graphics processing, comprising:
   receiving primitive vertex parameters corresponding to vertices of a video graphics primitive, wherein the primitive vertex parameters for each vertex include a primitive vertex set of three-dimensional coordinates and a primitive vertex normal vector;
   receiving control information;
   tessellating the video graphics primitive to produce a plurality of component primitives, wherein each component primitive of the plurality of component primitives is defined by component vertices having corresponding component vertex parameters, wherein component vertex parameters for each component vertex include a component vertex set of three-dimensional coordinates and a component vertex normal vector, wherein the component vertex parameters for each component vertex are derived from at least a portion of the primitive vertex parameters;
   for each component primitive of the plurality of component primitives:
   processing the component primitive using a three-dimensional processing pipeline, wherein processing generates pixel data corresponding to the component primitive; and
   wherein tessellating further comprises tessellating based on a tessellation level, wherein the tessellation level is set by the received control information and determines a number of component primitives included in the plurality of component primitives.

2. The method of claim 1, wherein tessellating the video graphics primitive further comprises calculating the component vertex parameters for each of the component vertices using linear interpolation.

3. The method of claim 1, wherein tessellating the video graphics primitive further comprises calculating the component vertex parameters for each of the component vertices using Nth order interpolation, wherein N is an integer greater than one.

4. The method of claim 1, wherein tessellating the video graphics primitive further comprises re-normalizing the component vertex normal vector included in the component vertex parameters for each of the component vertices.

5. The method of claim 1, wherein processing the component primitive includes adding lighting effects to the pixel data based on the component vertex normals for the vertices of the component primitives.

6. The method of claim 5, wherein adding lighting effects further comprises adding specular lighting effects.

7. The method of claim 5, wherein adding lighting effects further comprises adding diffuse lighting effects.

8. The method of claim 5, wherein adding lighting effects further comprises adding environment mapping Lighting effects.

9. The method of claim 5, wherein adding lighting effects further comprises:
   calculating vertex lighting effects at each of the component vertices of the component primitive; and
   calculating lighting effects for each pixel location in the component primitive by linearly interpolating the vertex lighting effects for at least a portion of the component vertices of the component primitive.

10. A video graphics circuit, comprising:
    a frame buffer that stores pixel data corresponding to image data for a frame;
    a central processor that generates processing commands and vertex parameters corresponding to video graphics primitives;
    a control processor operably coupled to the central processor, wherein the control processor receives the processing commands from the central processor, wherein the control processor generates control information based on the processing commands;
    a tessellation block operably coupled to the central processor and the control processor, wherein the tessellation block receives a first portion of the control information from the control processor, wherein, for each video graphics primitive, the tessellation block receives vertex parameters corresponding to each of the vertices of the video graphics primitive and tessellates the selected video graphics primitive based on tessellation information included in the first portion of the control information, wherein tessellation of the video graphics primitive produces component vertex parameters for a plurality of component primitives that correspond to the video graphics primitive;
    a lighting block operably coupled to the tessellation block and the control processor, wherein the lighting block receives component vertex parameters corresponding to each of the component primitives from the tessellation block and receives a second portion of the control information from the control processor, wherein the lighting block adds lighting effects to the component vertex parameters for each of the component primitives to produce modified vertex parameters, wherein the lighting effects are added based on at least a portion of the component vertex parameters and the second portion of the control information;
    a three-dimensional video graphics pipeline operably coupled to the lighting block, the control processor, and the frame buffer, wherein the three-dimensional video graphics pipeline receives the modified vertex parameters for each of the component primitives and processes each of the component primitives to generate pixel fragment data that is blended with the pixel data stored in the frame buffer; and
    wherein the tessellation information includes a controlled tessellation level, wherein the tessellation level determines a number of component primitives included in the plurality of component primitives for each of the video graphics primitives.

11. The video graphics circuit of claim 10, wherein the vertex parameters for each video graphics primitive and the component vertex parameters for each component primitive of the plurality of component primitives include, for each vertex, three-dimensional coordinates and a normal vector.

12. The video graphics circuit of claim 11, wherein the tessellation block re-normalizes the normal vector included in the component vertex parameters for each component primitive.

13. The video graphics circuit of claim 11, wherein the tessellation block tessellates each video graphics primitive by calculating the component vertex parameters for each component primitive from the vertex parameters for a corresponding video graphics primitive using linear interpolation.

14. The video graphics circuit of claim 11, wherein the tessellation block tessellates each video graphics primitive by deriving the component vertex parameters for each component primitive from the vertex parameters for a corresponding video graphics primitive using N-th order interpolation, wherein N is an integer greater than one.

15. The video graphics circuit of claim 11, wherein the lighting effects added by the lighting block include specular lighting effects.

16. The video graphics circuit of claim 15, wherein the lighting effects added by the lighting block include diffuse lighting effects.

17. The video graphics circuit of claim 15, wherein the lighting effects added by the lighting block include environmental mapping lighting effects.

18. A method for video graphics processing, comprising:
  receiving vertex parameters corresponding to vertices of a video graphics primitive, wherein the vertex parameters for each vertex includes three-dimensional coordinates and a normal vector;
  tessellating the video graphics primitive to produce a plurality of component primitives, wherein the plurality of component primitives are defined by a plurality of additional vertices and the vertices of the video graphics primitive; and
  calculating an additional normal vector for each additional vertex of the plurality of additional vertices; and
  wherein tessellating further comprises tessellating based on a controlled tessellation level, wherein the tessellation level determines a number of component primitives included in the plurality of component primitives.

19. The method of claim 18, wherein calculating an additional normal vector further comprises re-normalizing the additional normal vector.

20. The method of claim 18, wherein calculating further comprises deriving each additional normal vector from at least a portion of the normal vectors for the vertices of the video graphics primitive using linear interpolation.

21. The method of claim 18, wherein calculating further comprises deriving each additional normal vector from at least a portion of the normal vectors for the vertices of the video graphics primitive using N-th order interpolation, wherein N is an integer greater than one.

22. The method of claim 18 further comprises processing the plurality of component primitives using a three-dimensional pipeline, wherein processing the plurality of component primitive includes producing pixel data corresponding to the plurality of component primitives, wherein processing the plurality of component primitives further includes adding lighting effects to the pixel data based on the normal vectors and additional normal vectors corresponding to the vertices of the plurality of component primitives.

23. The method of claim 22, wherein adding lighting effects further comprises adding at least one of specular lighting effects, diffuse lighting effects, and environment mapping lighting effects.

24. The method of claim 22, wherein adding lighting effects further comprises:
  calculating vertex lighting effects at each vertex and each additional vertex corresponding to the plurality of component primitives; and
  calculating lighting effects for each pixel location in the plurality of component primitives by linearly interpolating the vertex lighting effects corresponding to a component primitive of the plurality of component primitive in which the pixel location is included.

25. The method of claim 18 comprising receiving control information which indicates whether or not to tessellate the video graphics primitive and if so, producing a number of component primitives corresponding to the controlled tessellation level wherein the tessellation level is included in the control information.

* * * * *